W. ROMEISER.
DIFFERENTIAL GEARING.
APPLICATION FILED MAY 13, 1914.
1,104,005.
Patented July 21, 1914.
2 SHEETS—SHEET 1.
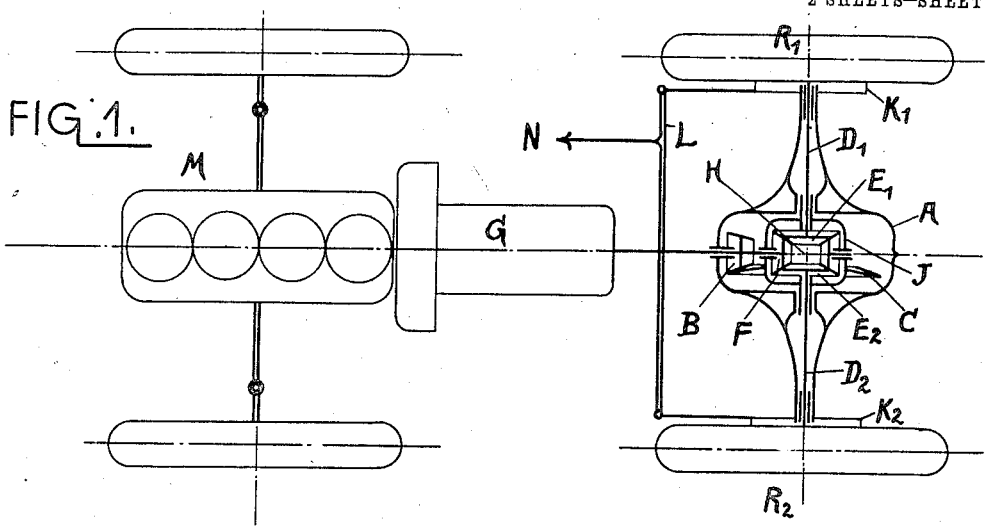
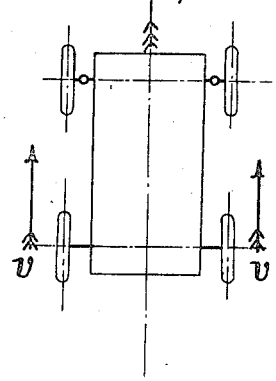
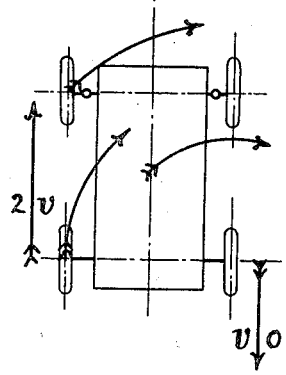
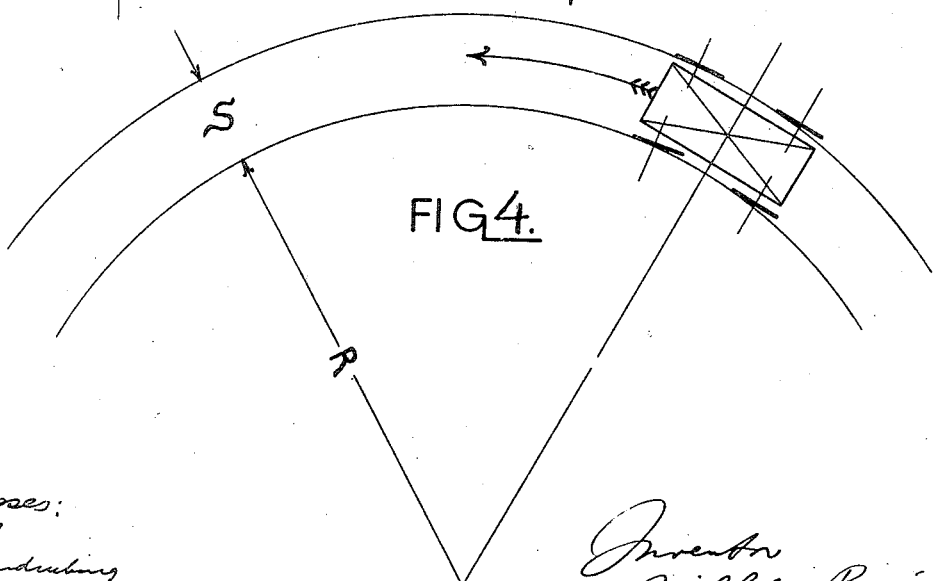
Witnesses:
Inventor
Wilhelm Romeiser
by W. F. Bissing attorney W. ROMEISER.
DIFFERENTIAL GEARING.
APPLICATION FILED MAY 13, 1914.
1,104,005.
Patented July 21, 1914.
2 SHEETS—SHEET 2.
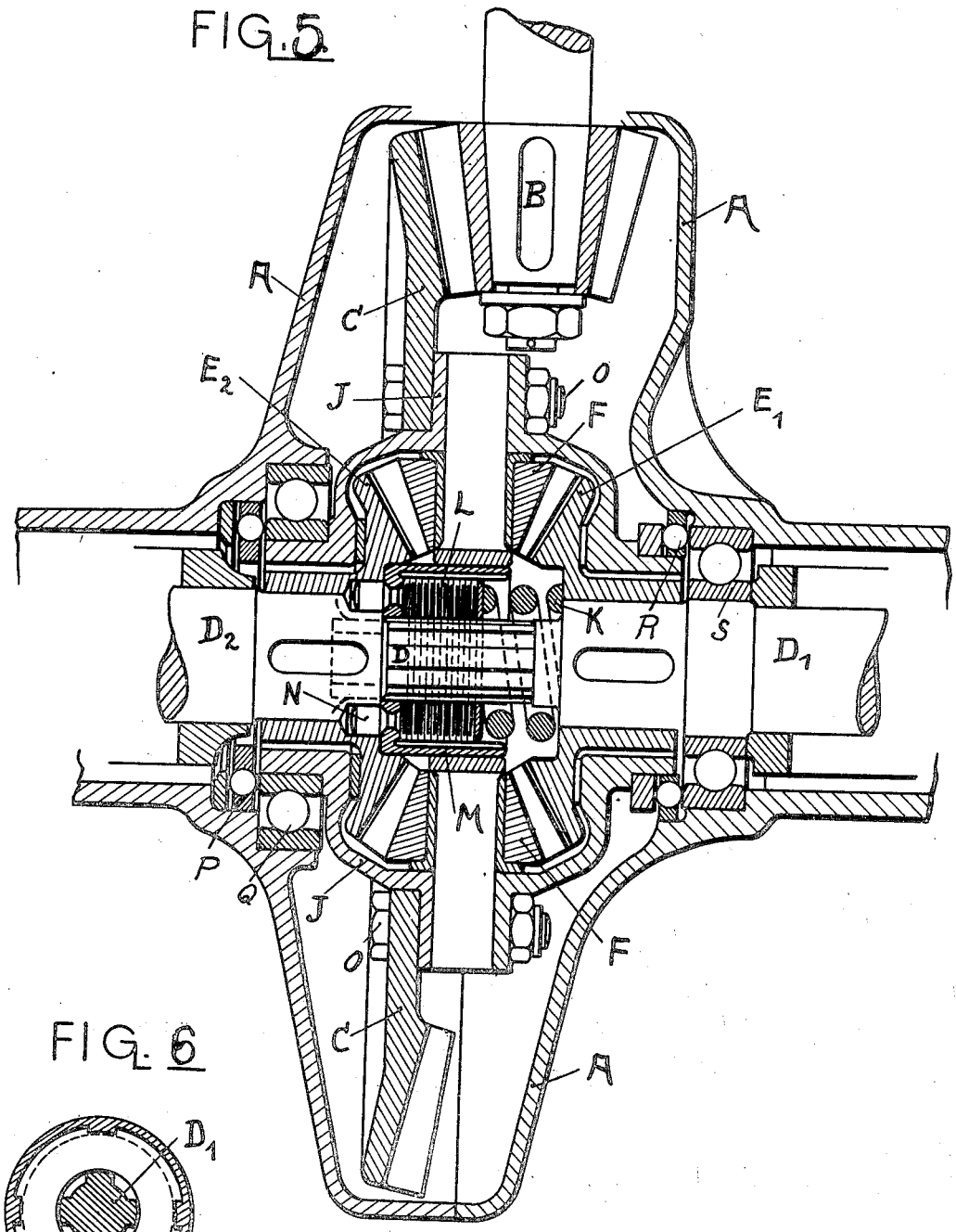
FIG. 5
FIG. 6
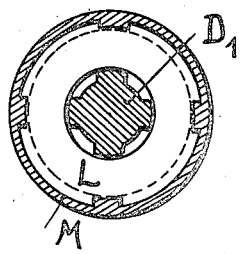
Witnesses:
Inventor
Wilhelm Romeiser
by
Attorney

UNITED STATES PATENT OFFICE.

WILHELM ROMEISER, OF WAIDMANNSLUST, NEAR BERLIN, GERMANY.

DIFFERENTIAL GEARING.

1,104,005.   Specification of Letters Patent.   Patented July 21, 1914.

Application filed May 13, 1914. Serial No. 838,245.

*To all whom it may concern:*

Be it known that I, WILHELM ROMEISER, a citizen of the German Empire, and residing at Waidmannslust, near Berlin, Germany, have invented certain new and useful Improvements in Differential Gearing, of which the following is a specification.

My invention relates to the differential gearing of motor-cars, and a primary object is to prevent the skidding and slipping of the wheels of motor-cars particularly those equipped with devices for braking the two-part rear axle connected with the differential gearing and steered by sluing the front wheels. The causes of these defects of such motor-cars, and the means I provide for obviating the defects are described more particularly hereinafter with reference to the drawings.

To these and other ends, my invention consists in the construction, arrangement and combination of parts described hereinafter and pointed out in the claims.

One embodiment of my invention is represented by way of example in the accompanying drawings, wherein:—

Figure 1 is a diagram showing a known arrangement of a differential gearing and braking mechanism in a motor-car, Figs. 2 and 3 are diagrams illustrating some of the actions which take place under conditions hereinafter mentioned, and Fig. 4 is a diagram showing a motor-car traveling around a curve; Fig. 5 is a section of a differential gearing combined with a friction clutch according to my invention, and Fig. 6 is a cross-section of the clutch only.

Referring first to the known arrangement shown in Fig. 1, the motor M drives the transmission gearing G which in turn drives the pinion B and the driving gear wheel C.

The driving axle consists not of one piece, but of two halves $D_1$ and $D_2$ connected by the well-known differential gearing H which operates as follows. If the frictional resistance to motion of the track wheels $R_1$ and $R_2$ is equally great as also the friction in the bearings of the halves $D_1$ and $D_2$ of the rear axle, then the small differential or planet wheels F fixedly journaled in the casing J carried by the driving gear wheel have no occasion to rotate about their own axes and they drive the two halves of the axle equally. In this case the car is driven rectilinearly by both wheels equally, each wheel having a velocity $v$ as shown in Fig. 2, and the car travels forward rectilinearly.

If one of the driven track wheels or one of the halves of the driving axle is braked by hand for any reason or otherwise owing to any cause mentioned hereinafter, it is obvious that the differential gearing admits of the one track wheel lagging behind, in which case the planet wheels F rotate about their own axles. In this case the one side of the car is retarded and the other accelerated. In an extreme case illustrated in Fig. 3, when the engine drives only the one half of the rear axle and the other half and its track wheel are stationary, *i. e.* $v=o$, say owing to being braked, the other track wheel is driven at a velocity, *i. e.* $2\,v$, which is exactly twice the speed that it had before when both wheels ran at a uniform speed $v$. For this driven track wheel now has imparted to it not only the motion of the driving pinion C, but also an additional motion due to the rolling of the planet wheels F on the stationary gear wheel $E_1$ or $E_2$ respectively fast on the halves $D_1$ and $D_2$ of the rear axle. If the car is being driven forward uniformly by both track wheels $R_1$ and $R_2$ as shown in Fig. 2, it is therefore clear that this condition of things is altered at the moment when severe braking on one side occurs during travel. For example, let it be assumed that the car has a uniform forward speed of 20 meters per second and that one driving track wheel is suddenly braked and stopped and tends to impart to the car a speed of 0 meters per second, the other track wheel is then driven by the differential gearing at twice its former speed and tends to impart a speed of 40 meters per second to the car, and consequently the car is slued around and skids, as indicated by the curved arrows in Fig. 3. Obviously the skidding will be more violent the more severely one side only is braked, the greater the velocity of the car and the more slippery the track. If the track is free the car may suddenly turn around in a circle once or more times, while if obstacles are in its path the car may be destroyed.

The described braking action on one side may occur at any moment without any fault of the driver while traveling at full speed when the hand brake is actuated and the brake compensating device N, L fails to operate correctly and only one of the brake bands $K_1$ and $K_2$ operates, or when one bearing of the rear axle binds, or when one wheel brakes and so on.

Another disadvantage of the uncontrolled differential gearing is that the driving track wheels cannot exercise a proper thrust on the car and the car does not start when only one wheel meets with a sufficient frictional resistance, while the other meets with insufficient frictional resistance owing to insufficient load on it or to its resting on snow, ice or mud. In this case the one track wheel slips, i. e. the one wheel which meets with sufficient frictional resistance remains stationary while the other rotates about its axis without driving the car. This is a great defect in the case of freight cars and, particularly, in military motor-cars.

My invention is based on the recognition of the fact that for the purpose of enabling a car to travel around curves the differential gearing does not require to be able to operate nearly as freely as is universally the case in practice at the present day. The difference in length of the paths traveled by the two rear wheels when traveling around a curve is generally relatively small and is large only when the curves are of quite small radius. For example, as shown in Fig. 5, the length of the path traveled by the wheels of a car traveling in a circle is $2\pi R$ for the inner wheels and $2\pi(R+S)$ for the outer wheels, when R is the radius of the circle traveled and S the track gage. The difference between the two lengths is always the same whether the circle is large or small and, is always $2\pi$ times the gage of the track. When traveling along curves of large radius this difference can be entirely neglected, just as it is neglected in all railway cars and street cars. Short turns and narrow curves are traveled at low speeds. At a low speed, however, the greatest torque is exercised on the driving axle, and the least torque when the speed is high.

According to my invention I limit the operation of the differential gearing by subjecting it to the action of means, e. g. a clutch, which limits its action without materially interfering with the steering of the car. Experience shows that such limiting action may be very considerable without interfering with the steering qualities or efficiency of the car.

Referring now to Figs. 5 and 6, the novel combination of a differential gearing with a friction clutch operatively connecting the two halves of the rear axle is here shown: The driving pinion B of the Cardan shaft meshes with the large driving gear wheel C which is rigidly secured by bolts O to the casing J inclosing the differential gearing proper which in turn imparts to the two halves $D_1$ and $D_2$ of the rear axle the turning forces exercised by the gear wheel C. The differential gearing comprises the bevel gears $E_1$ and $E_2$ which are fast on the two halves $D_1$ and $D_2$, respectively, of the rear axle, and the planet wheels F rotatably mounted in the casing J and meshing with the said bevel gears. The mechanism is inclosed within a differential gear case A, and ball bearings P, Q, R, S are provided where desirable. The arrangement of parts described so far is well known in itself and the differential gearing operates in known manner.

In order to limit the described objectionable action of the differential gearing as much as possible and to allow the gearing freedom of movement only to such an extent as is necessary for traveling around curves, I combine with the gearing a friction clutch or other equivalent means which will now be described.

In the illustrative embodiment the clutch includes the internally ribbed casing M which is connected by driving pins N with the half $D_2$ of the axle. The end of the other half $D_1$ projects into immediate proximity of the half $D_2$ and has a star-section, as shown in Fig. 6. The casing M and the end of the half $D_1$ of the axle are connected by two sets of thin plates L arranged alternately, the one set being driven by the ribs of the casing M and the other by the ribs of the half $D_1$ of the axle. The spring K tends to press the plates together and produces the requisite friction. By varying the strength of the spring K and the number of plates L the friction of the clutch can be adjusted.

The described combination operates as follows:—The two halves $D_1$ and $D_2$ of the axle are now connected not only by the differential gear wheels F, $E_1$ and $E_2$, but also by the friction clutch which is so designed that it admits of the equalization of the differences in length of path traveled by the track wheels when running around a curve. Also, it has the very important advantage that when one half of the axle is subjected to a braking action, this action is automatically imparted to the other half of the axle and the primary tendency being to retard instead of to accelerate the other half of the axle. Tests have shown that the clutch may be made so powerful that the exceedingly dangerous skidding mentioned above can be entirely obviated and the injurious slipping of the driving track wheels can be limited to a minimum without the capacity of steering and the driving capacity of the car being diminished.

I claim:—

1. In a motor-car, the combination with a two-part driving axle and a differential gearing connecting the two parts of the axle, of means constantly and yieldingly connecting the two parts of the axle and tending to cause the two parts of the driving axle to rotate synchronously.

2. The combination with a two-part driving axle and a differential gearing connecting the same, of frictional means constantly connecting the two parts of the axle and tending to retard the speed of the one part when the speed of the other part is retarded.

3. The combination with a two-part driving axle and a differential gearing connecting two adjacent ends of the two parts of the axle, of a friction clutch likewise constantly connecting the said ends of the two parts of the driving axle.

4. The combination with a two-part driving axle and a differential gearing connecting two adjacent ends of the two parts of the axle, of a casing adapted to be driven by one end of the one part of the axle, a plurality of plates adapted to be driven by said casing, a plurality of plates arranged alternately with the former plates and adapted to be driven by the end of the other part of the axle, and a spring tending to press said plates one against another, substantially as shown.

5. The combination with a two-part driving axle and a differential gearing connecting two adjacent ends of the two parts of the axle, of an internally ribbed casing adapted to be driven by one of said ends, a plurality of plates surrounding the other of said ends and engaging the ribs in said casing, a plurality of plates non-rotatably mounted on the latter end and arranged alternately with the former plates, and a spring tending to press said plates one against another, substantially as shown.

In testimony whereof, I affix my signature in the presence of two witnesses.

WILHELM ROMEISER.

Witnesses:
  WOLDEMAR HAUPT,
  HENRY HASPER.